United States Patent
Liu

(10) Patent No.: US 8,454,217 B2
(45) Date of Patent: Jun. 4, 2013

(54) ELECTRONIC DEVICE

(75) Inventor: Zhi-Hua Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 210 days.

(21) Appl. No.: 13/078,146

(22) Filed: Apr. 1, 2011

(65) Prior Publication Data

US 2012/0051081 A1 Mar. 1, 2012

(30) Foreign Application Priority Data

Aug. 27, 2010 (CN) .......................... 2010 1 0264800

(51) Int. Cl.
*F21V 17/18* (2006.01)
*G02B 6/36* (2006.01)

(52) U.S. Cl.
USPC ........................................... 362/581; 385/53

(58) Field of Classification Search
USPC .................. 362/551, 581; 385/62, 53, 88, 92
See application file for complete search history.

(56) References Cited

U.S. PATENT DOCUMENTS

| 4,952,798 | A | * | 8/1990 | Graham et al. | 250/227.11 |
| 5,076,688 | A | * | 12/1991 | Bowen et al. | 356/73.1 |
| 5,838,855 | A | * | 11/1998 | Stephenson | 385/53 |
| 5,938,324 | A | * | 8/1999 | Salmon et al. | 362/555 |
| 6,746,145 | B1 | * | 6/2004 | Wu | 362/581 |
| 6,805,477 | B1 | * | 10/2004 | Wu | 362/581 |
| 7,334,945 | B2 | * | 2/2008 | Bina et al. | 385/88 |

* cited by examiner

*Primary Examiner* — Alan Cariaso
(74) *Attorney, Agent, or Firm* — Altis Law Group, Inc.

(57) ABSTRACT

An electronic device includes a housing and a light guide member. The housing defines a mounting hole and one or more positioning portions formed on an inner wall of the mounting hole. The light guide member is detachably mounted to the housing and received within the mounting hole of the housing. The light guide member includes a main body, one or more resilient portions formed on the main body, and one or more latching portions formed on the resilient portions corresponding to the positioning portions of the mounting hole of the housing. The latching portion is detachably latched with the positioning portion via the deformation and returning to original shape of the resilient portion. Thus, the light guide member is conveniently mounted on or detached from the housing.

11 Claims, 4 Drawing Sheets

ELECTRONIC DEVICE

BACKGROUND

1. Technical Field

The present disclosure relates to electronic devices, and particularly, to an electronic device employing a light guide member.

2. Description of Related Art

Commonly used electronic devices such as notebook computers, or mobile phones generally include a housing and a light emitting device mounted to the housing. The light emitting device may be employed as a signal indicator light. The light emitting device includes a light source and a light guide member for guiding the light emitted by the light source to the outside of the housing. The housing defines a mounting hole for receiving the light guide member. The housing can be made of plastic or metal material. If the housing is made of plastic material, the light guide member may be fixed to the mounting hole of the housing by hot-melt technology. If the housing is made of metal material, the light guide member may be fixed to the mounting hole of the housing by a double faced adhesive tape.

However, in use, a light output surface of the light guide member is always exposed to the outside of the housing, thus, it is easily worn out badly after being used an extended time duration. Therefore, the light guide member often needs to be detached and replaced. As the existing light guide member is directly fixed to the mounting hole of the housing, thus, it is harder to be detached and is easy to damage the housing.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the electronic device. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
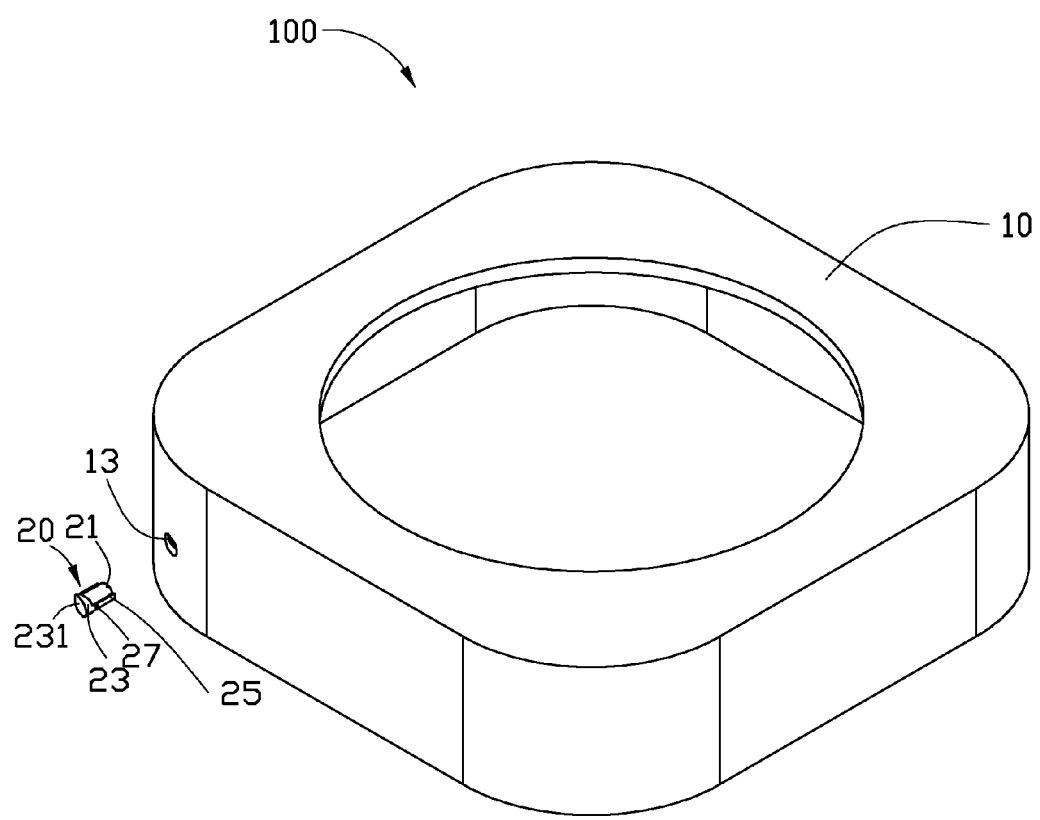
FIG. 1 shows a partial, exploded, isometric view of an embodiment of an electronic device, wherein, the electronic device includes a housing and a light guide member detachably mounted to the housing.
Figure 4:
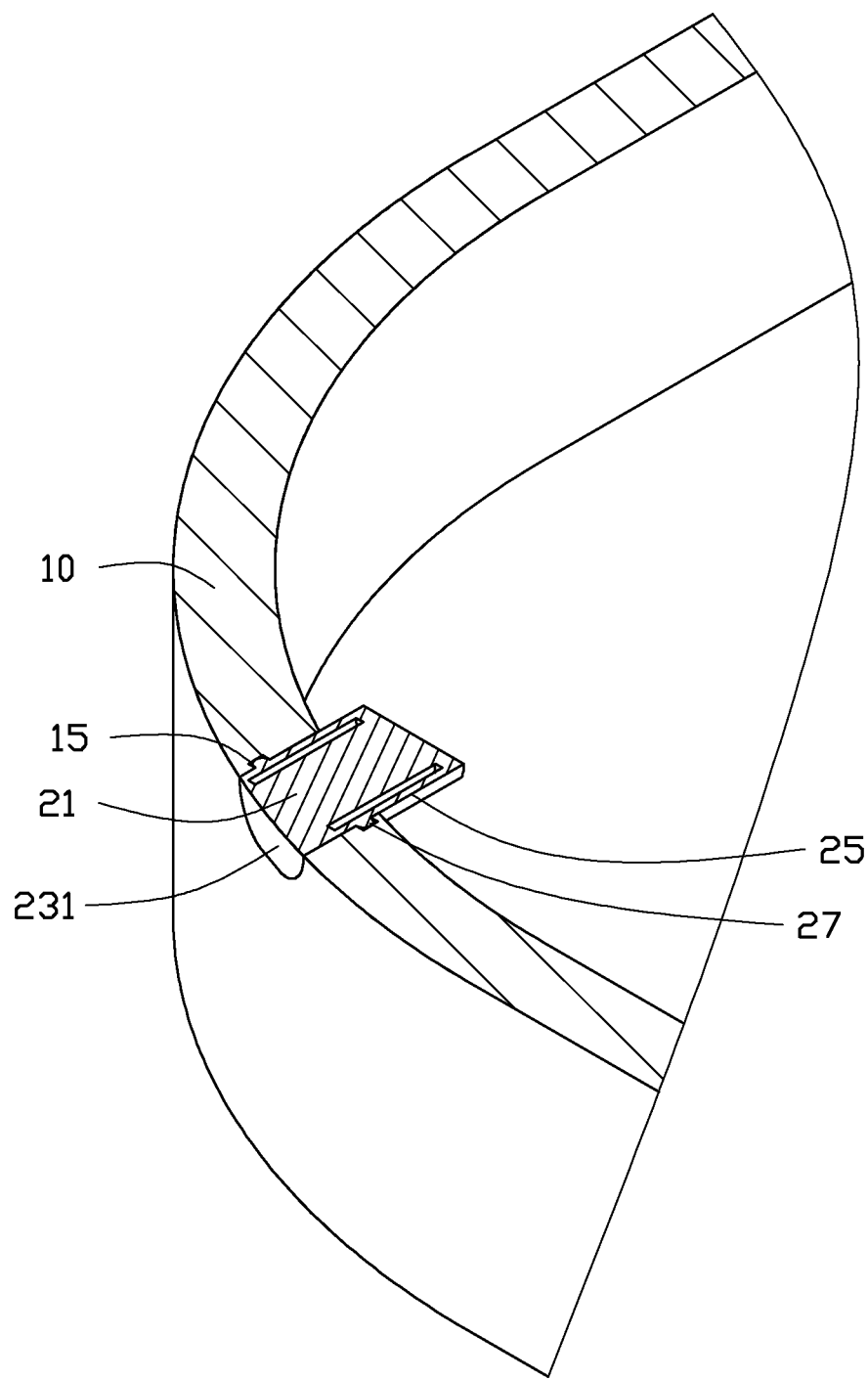
FIG. 4 shows a partial, sectional view taken from FIG. 3.

Referring to FIGS. 1 and 4, an embodiment of an electronic device 100 includes a housing 10 and a light guide member 20 detachably mounted to the housing 10. The housing 10 is a substantially hollow rectangular body having four arc-shaped corners (not labeled). A mounting hole 13 is defined through an outer side surface of the housing 10 and located adjacent to one corner of the housing 10. The mounting hole 13 is a substantially oval-shaped hole and further forms a positioning portion 15 in an inner wall of the mounting hole 13. In the illustrated embodiment, the positioning portion 15 is a ring shaped slot recessed from the inner wall of the mounting hole 13 and positioned adjacent to the outside surface of the housing 10. The housing 10 is made of metal. The light guide member 20 is made of transparent resin or glass.

Figure 2:
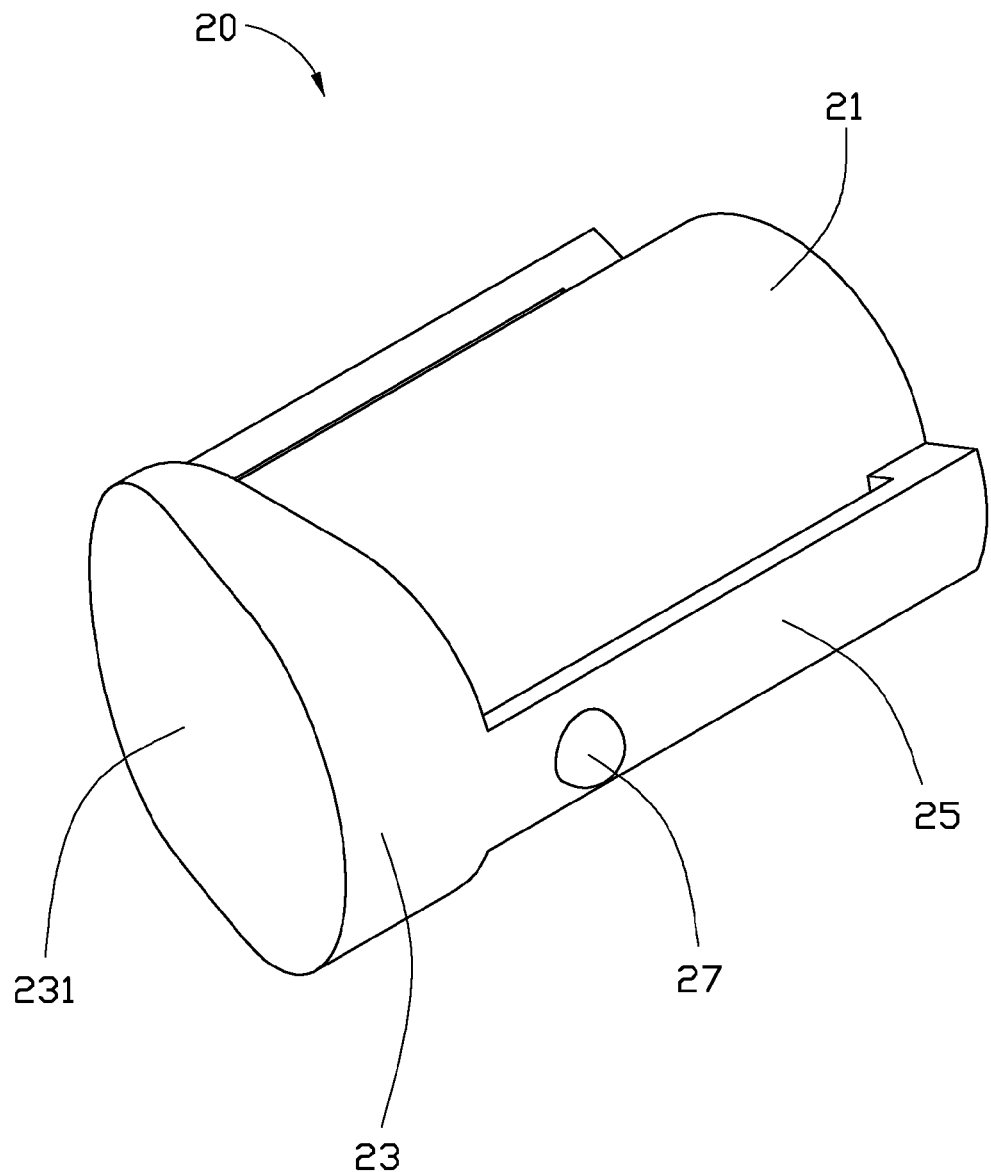
FIG. 2 shows an isometric view of the light guide member of the electronic device shown in FIG. 1.

Also referring to FIG. 2, the light guide member 20 includes a main body 21, a light emitting portion 23, two resilient portions 25 and two latching portions 27. The main body 21 is substantially cylindrical. The light emitting portion 23 is formed at a distal end of the main body 21, and has a substantially arc-shaped light emitting surface 231 corresponding to the arc-shaped outer side surface of the housing 10. The light emitting portion 23 has a shape corresponding to the mounting hole 13 of the housing 10. The two resilient portions 25 are symmetrically formed on opposite side surfaces of the main body 21 along a central axis of the main body 21. Each resilient portion 25 is substantially L-shaped. Two ends of each resilient portion 25 are connected with the main body 21 and the light emitting portion 23, respectively. The two latching portions 27 are respectively formed on the two resilient portions 25 and are located adjacent to the light emitting portion 23. In the illustrated embodiment, the two latching portions 27 are two latching blocks protruding from the two resilient portions 25 corresponding to the positioning portion 15 of the housing 10.

Figure 3:
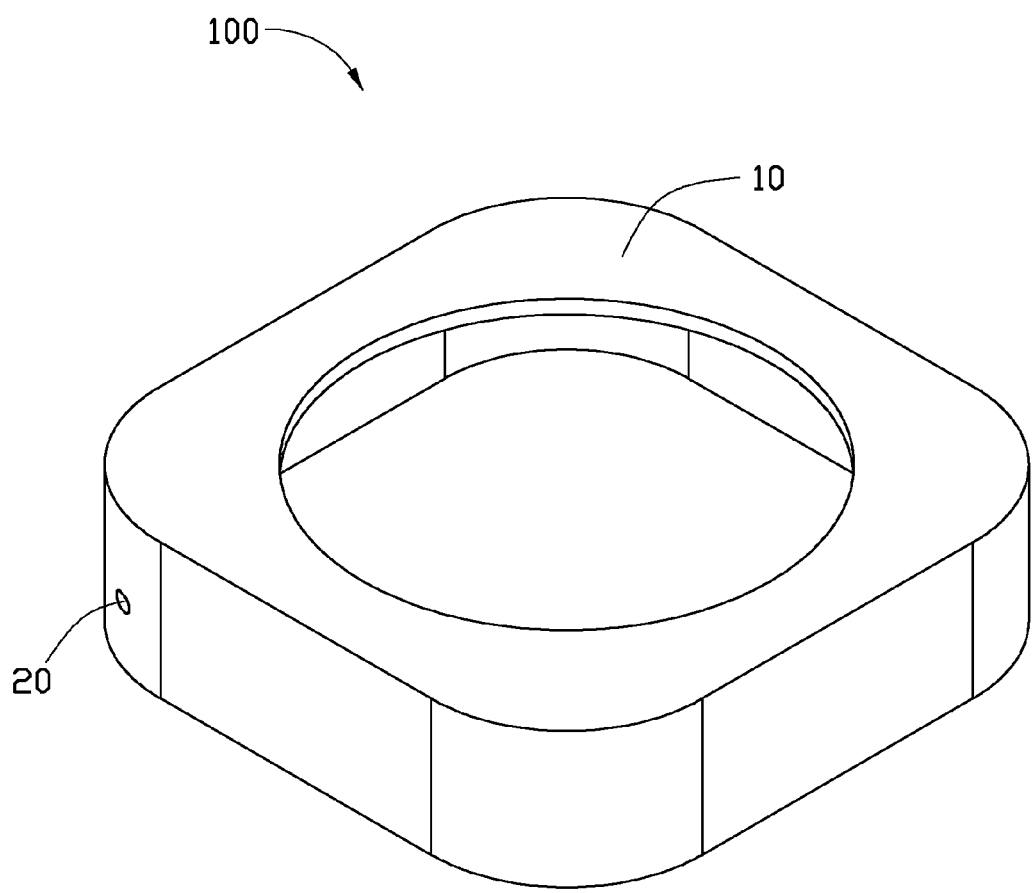
FIG. 3 shows an assembled, isometric view of the electronic device shown in FIG. 1.

Referring to FIGS. 1, 3 and 4, when assembling the light guide member 20, the light emitting portion 23 of the light guide member 20 is aligned with and inserted into the mounting hole 13 of the housing 10 from the inner side of the housing 10 toward the outer side of the housing 10. The two resilient portions 25 are extruded and are deformed during the inserting process of the light guide member 20. The light guide member 20 is pushed inward such that the two latching portions 27 are latched into the corresponding positioning portions 15 of mounting hole 13, meanwhile, the two resilient portions 25 are released to return back to their original positions. Thus, the light guide member 20 is firmly mounted to the mounting hole 13 of the housing 10.

If the light guide member 20 was worn out in use, then, the light guide member 20 could be easily detached from the mounting hole 13 of the housing 10 for facilitating the replacement of a new one.

It should be noted that the light emitting portion 23 could be omitted as the outside surface of the housing 10 is a flat surface.

It is to be understood that the resilient portion 25 is not limited to the L-shaped, it may also be a ring-shaped protrusion protruding from the main body 21. The number of the resilient portions 25 is not limited to two, and it may be only one. In addition, the latching portion 27 is also not limited to the latching block, but it also can be other structures, such as, the latching portion 27 could be a latching groove defined in the resilient portion 25, and then the positioning portion 15 is a latching protrusion formed on the inner wall of the mounting hole 13.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device, comprising: a housing defining a mounting hole, and further comprising one or more positioning portions formed on an inner wall of the mounting hole; and a light guide member detachably mounted to the housing and received within the mounting hole of the housing, the light guide member comprising: a main body and a light emitting portion formed at a distal end of the main body; one or more resilient portions formed on the main body, wherein the resilient portion is substantially L-shaped and formed on the main body along a central axis of the main body, and two ends of the resilient portion are respectively connected with the main body and the light emitting portion; and one latching portion formed on each resilient portion corresponding to one positioning portion of the mounting hole of the housing, the latching portion detachably latched with the positioning portion via the deformation and the returning to the original shape of the resilient portion, wherein the positioning portion is a ring shaped slot recessed from the inner wall of the mounting hole.

2. The electronic device of claim 1, wherein the latching portion is a latching block protruding from the resilient portion corresponding to the positioning portion of the housing.

3. The electronic device of claim 1, wherein the housing is made of metal, the light guide member is made of transparent resin or glass.

4. The electronic device of claim 1, wherein the housing is a substantially hollow rectangular body having four arc-shaped corners, and the mounting hole is defined through an outer side surface of the housing and located adjacent to one corner of the housing.

5. The electronic device of claim 4, wherein the mounting hole is a substantially oval-shaped hole.

6. An electronic device, comprising: a housing defining a mounting hole and further comprising a positioning portion formed on an inner wall of the mounting hole; and a light guide member detachably mounted to the housing and received within the mounting hole of the housing, the light guide member comprising: a main body and a light emitting portion formed at a distal end of the main body; two resilient portions symmetrically formed on opposite side surfaces of the main body along a central axis of the main body, wherein each resilient portion is substantially L-shaped, and two ends of the resilient portion are respectively connected with the main body and the light emitting portion; and two latching portions respectively formed on the two resilient portions corresponding to the positioning portion of the mounting hole, the two latching portions detachably latched with the positioning portion via the deformation and the returning to original shape of the resilient portion, wherein the positioning portion is a ring shaped slot recessed from the inner wall of the mounting hole.

7. The electronic device of claim 6, wherein the two latching portions are two latching blocks respectively protruding from the two resilient portions and latching into the positioning portion of the housing.

8. The electronic device of claim 6, wherein the housing is made of metal, and the light guide member is made of transparent resin or glass.

9. The electronic device of claim 6, wherein the housing is a substantially hollow rectangular body having four arc-shaped corners, and the mounting hole is defined through an outer side surface of the housing and located adjacent to one corner of the housing.

10. The electronic device of claim 9, wherein the mounting hole is a substantially oval-shaped hole, and the main body is substantially cylindrical.

11. The electronic device of claim 6, wherein the latching portion is a latching groove defined in the resilient portion, and the positioning portion is a latching protrusion formed on the inner wall of the mounting hole.

* * * * *